(12) United States Patent
Inoue et al.

(10) Patent No.: US 6,890,277 B2
(45) Date of Patent: May 10, 2005

(54) SANDWICH-MOLDED GUIDE FOR TRANSMISSION DEVICE (75) Inventors: Kozo Inoue, Osaka (JP); Osamu Ono, Osaka (JP); Shuuji Matsumura, Higashimatsuyama (JP); Koji Yamawaki, Osaka (JP)

(73) Assignees: Tsubakimoto Chain Co., Osaka (JP); I & P Co., Ltd., Saitama (JP); Tsubakimoto Kogyo Co., Ltd., Osaka (JP)

( * ) Notice: Subject to any disclaimer, the term of this patent is extended or adjusted under 35 U.S.C. 154(b) by 282 days.

(21) Appl. No.: 10/167,345

(22) Filed: Jun. 10, 2002

(65) Prior Publication Data

US 2002/0193192 A1 Dec. 19, 2002

(30) Foreign Application Priority Data

Jun. 13, 2001 (JP) ........................................ 2001/179293

(51) Int. Cl.$^7$ .............................. F16H 7/08; F16H 7/18
(52) U.S. Cl. ...................................................... 474/111
(58) Field of Search ................................ 474/111, 140; 525/432, 183, 286; 524/13, 35, 556, 538, 449; 428/220, 357, 392, 394

(56) References Cited

U.S. PATENT DOCUMENTS

| | | | |
|---|---|---|---|
| 4,832,664 A | * 5/1989 | Groger et al. | 474/111 |
| 4,980,407 A | * 12/1990 | Okumoto et al. | 525/432 |
| 5,690,569 A | * 11/1997 | Ledvina et al. | 474/111 |
| 5,813,935 A | * 9/1998 | Dembosky et al. | 474/111 |
| 5,985,429 A | * 11/1999 | Plummer et al. | 428/357 |
| 6,103,779 A | * 8/2000 | Guzauskas | 524/556 |
| 6,634,974 B2 | * 10/2003 | Fujiwara et al. | 474/111 |
| 2002/0050184 A1 | 5/2002 | Suzuki | |

FOREIGN PATENT DOCUMENTS

| | | | | |
|---|---|---|---|---|
| DE | 4310306 A1 | * 10/1994 | | 474/111 |
| DE | 199 23 905 A1 | 11/2000 | | |
| EP | 0 846 891 A1 | 6/1998 | | |
| GB | 2 351 136 A | 12/2002 | | |
| JP | 60-174621 A | * 9/1985 | | B29C/45/16 |
| JP | 62-132623 A | * 6/1987 | | B29C/45/16 |
| JP | 03-81124 A | * 4/1991 | | B29C/45/16 |
| JP | 08254253 | 10/1996 | | |
| JP | 9-324839 | 12/1997 | | |
| JP | 2818795 | 8/1998 | | |

OTHER PUBLICATIONS

Patent Abstracts of Japan, JP 10 292855, Nov. 4, 1998, Abstract, Shoe Member Mounting Device of Tensioner Lever.

* cited by examiner

*Primary Examiner*—Marcus Charles
(74) *Attorney, Agent, or Firm*—Howson & Howson

(57) ABSTRACT

A guide for as transmission device such as a chain or belt, is injection molded using a sandwich-molding process. The sandwhich-molded guide comprises a slide rail on which a chain or belt slides, and a rail supporting member intergrally provided along with the slide rail. The slide rail is composed of a material the principle component of which is first polymeric material having wear resistance and heat resistance, and the rail supporting member is composed of a material the principle component of which is a second polymeric material having higher strength than the material having the first polymeric material as its principle component. The slide rail and the rail supporting member are intimately joined to each other by injection molding using the sandwhich molding process.

15 Claims, 6 Drawing Sheets

SANDWICH-MOLDED GUIDE FOR TRANSMISSION DEVICE

FIELD OF THE INVENTION

This invention relates to a guide, composed of plastics, for a mechanical power transmission device such as a chain or a belt, in a motor vehicle engine or the like.

In motor vehicle engines, mechanical power is transmitted, for example from a crankshaft to a camshaft, by a power transmission medium such as an endless chain or a belt. A chain travels in a circulating path around a driving sprocket and a driven sprocket. A belt travels in a circulating path around a driving pulley and a driven pulley. The invention relates more specifically to a guide, composed of plastics material, for a power transmission device. The guide in accordance with the invention may be used as a fixed guide, or as a movable guide, to guide and/or regulate tension in, a power transmission medium such as a chain, belt or the like, which travels over the guide, while in sliding contact with the guide.

BACKGROUND OF THE INVENTION

In general, in a motor vehicle engine, or other machine which utilizes a chain, a belt, or the like as a power transmission medium, a fixed or movable guide over which the transmission medium slides, is attached, by a mounting bolt, a pin, or a similar fastener, to an engine block, or to another frame member.

A movable guide, such as a tensioner lever or the like used in such a transmission device, imparts appropriate tension to a power transmission medium in order to prevent transmission failure due to excess stretching, or excess loosening of the circulating power transmission medium. A fixed guide, such as a guide rail or the like, limits the power transmission medium to a predetermined path of travel in order to prevent the power transmission medium from producing vibration noise, and to prevent sideward vibration, and disengagement.

Figure 10:
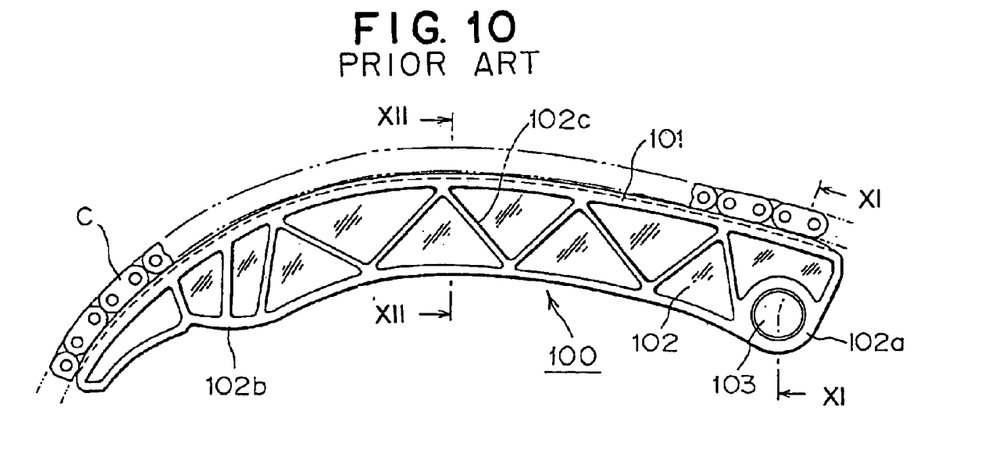
FIG. 10 is a front elevational view of a conventional movable guide.
Figure 11:
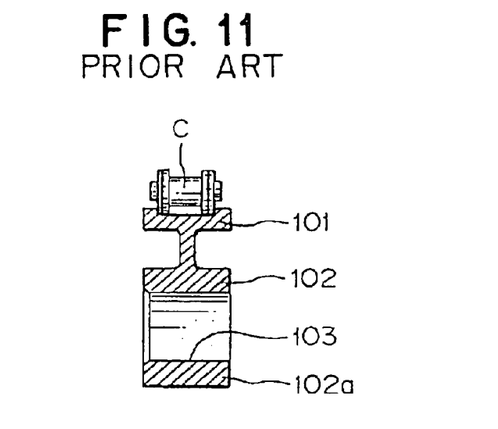
FIG. 11 is a cross-sectional view taken on surface XI—XI in FIG. 10.
Figure 12:
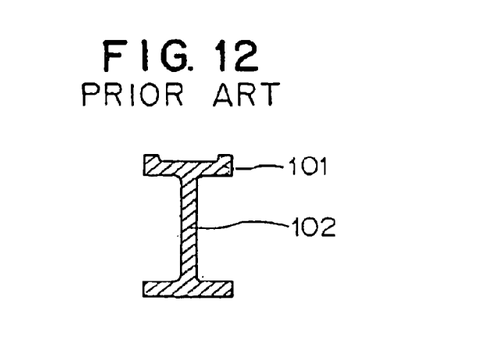
FIG. 12 is a cross-sectional view taken on plane XII—XII in FIG. 10.

A conventional movable guide, such as the chain tensioner guide 100 depicted in FIG. 10, is typically molded from a single synthetic resin. The guide 100 comprises a slide rail 101, which is in sliding contact with a traveling, power-transmitting chain C, and a rail supporting member 102 extending longitudinally along the back side of the slide rail. Referring to FIGS. 10 and 11, the rail supporting member 102 includes a boss 102a, having a mounting hole 103, allowing the rail supporting member to be attached to an engine block or the like so that it can function as a movable guide. A tensioner (not shown) abuts a tensioner abutting portion 102b of the rail supporting member 102 in order to apply the appropriate tension to the chain, thereby preventing excessive stretching, or excessive loosening, of the chain, either of which could result in transmission failure. Ribs 102c serve to reinforce the guide while minimizing its weight.

In the conventional guide 100, which is integrally molded from a single synthetic resin, the maintenance of good sliding contact and wear resistance in the slide rail 101 is incompatible with the achievement of adequate strength in the supporting member 102, especially in the environment of a motor vehicle engine, where temperatures around 200° C. may be encountered. When the guide 100 for the transmission device is molded from a plastics material having superior sliding contact properties and wear resistance, other desirable mechanical properties of the guide 100, such as strength, are sacrificed. Furthermore, when the cross-section of the guide is increased to compensate for its inadequate strength, the larger size of the guide requires more space, and makes installation of the guide onto an engine block wall more difficult.

To solve the above-mentioned problems a slide, proposed in Japanese Patent No. 2818795, includes a supporting member consisting of a high strength synthetic resin and a slide liner consisting of a synthetic resin having good wear resistance connected to the supporting member. Either the supporting member or the sliding lining body was used as a mold, and the other was injection molded. As an alternative, a chain tensioner described in Japanese laid-open Patent Publication No. Hei. 8-254253, was insertion-molded using a steel sheet as a core. In Japanese laid-open Patent Publication No. Hei. 9-324839, a guide rail was proposed in which a slide path liner was fitted to a carrier by a friction locking system.

To produce the slide disclosed in Japanese Patent No. 2818795, where either the supporting member or the slide lining body was used as a mold, and the other was injection molded, two molding steps were required. Moreover, to integrate both synthetic resin elements, it was necessary to form a dovetail groove by molding. Consequently, the mold structure became complex and manufacturing cost was increased.

In the chain tensioner disclosed in Japanese laid-open Patent Publication No. Hei. 8-254253, deformation could be generated in the guide itself as a result of the difference between the coefficients of expansion of the steel core material and the plastics material, resulting in breakage. Moreover, because of the weight of the steel core material it was not possible to achieve a weight reduction.

In the guide rail disclosed Japanese laid-open Patent Publication No. Hei. 9-324839, where the slide path liner and the carrier were fitted together releasably by a friction locking system, the manufacturing steps were complex, the manufacturing cost was high, and the friction locking portion was subject to breakage.

Accordingly, in prior art tensioner guides, reliability and mechanical strength of the guide rails were not entirely satisfactory.

SUMMARY OF THE INVENTION

It is, accordingly, a general object of the invention to solve the above-mentioned problems encountered with conventional guides for power transmission devices such as chains and belts.

Another object of the invention is to provide a guide which can easily be injection-molded without using a complex mold and complex manufacturing steps, and which has not only enhanced mechanical strength but also good sliding contact properties and good wear resistance.

Still another object of the invention is to provide a molded guide for a transmission device, which is light in weight and which has enhanced durability.

It is also an object of the invention to provide a power transmission apparatus, incorporating a power transmission device such as an endless chain or belt, and an improved guide or tensioner lever having the above-mentioned combined properties.

The sandwich-molded guide in accordance with the invention comprises a slide rail on which a power transmission medium slides, and a rail supporting member integral with, and extending along the slide rail. The slide rail is composed of a material the principal component of which is a first polymeric material having wear resistance and heat resistance. The rail supporting member is composed of a material the principal component of which is a second polymeric material having higher strength than that of the material having said first polymeric material as its principal component. The slide rail and the rail supporting member are intimately joined to each other by injection molding using a sandwich molding process.

In a preferred embodiment of the invention, the second polymeric material, is a composite material containing an inorganic material. In another preferred embodiment, the second polymeric material, is a long fiber reinforced polymeric material. In another preferred embodiment, surface layer portions of the slide rail the rail supporting member are integrally coating-molded from the first polymeric material having wear resistance and heat resistance.

In a preferred embodiment, both the first polymeric material and the second polymeric material are nylon.

In still another preferred embodiment, the first polymeric material and said second polymeric material are nylon 6.

In still another preferred embodiment the first polymeric material is nylon 46 and the second polymeric material is nylon 66.

Finally, in still another preferred embodiment, the first and second polymeric materials are both aromatic nylon.

The sandwich-molding process of this invention is a process of manufacturing a molded product consisting of two kinds of polymeric materials, a so-called "two-layered" molded product, by injection-molding two kinds of molten polymeric materials into a mold, whose shape corresponds to the external shape of the product to be molded. The two polymeric materials are molded simultaneously or substantially simultaneously. A known injection-molding machine for sandwich molding can be used in the sandwich-molding process according to the invention. Although known injection-molding machines for sandwich molding include various sandwich nozzles, in the case of an injection-molding machine for sandwich molding including parallel type sandwich nozzles, the filling of the mold with two kinds of polymeric materials can be precisely controlled in accordance with the shape of the molded product by moving a torpedo (that is, a pour switching member for switching between a skin material and a core material) forward or backward in the parallel type sandwich nozzles.

The first and second polymeric materials, which are the principal component materials of the slide rail and the rail supporting member respectively, are not significantly limited except that the first should have good wear and heat resistance and the second should be stronger than the first. However, it is preferable that both polymeric materials be fused with each other at the boundary region where they come together, so that they are intimately joined, and that they have a chemical affinity and substantially the same shrinkage characteristics. More specifically, the first and second polymeric materials may include polyamide resin or the like selected from nylon, nylon 66, nylon 46 or aromatic nylon etc.

Further, if the material of the rail supporting member, the principal component of which is the second polymeric material, has higher strength than the material of the slide rail, the principal component of which is the first polymeric material, even if the second polymeric material is the same as the first polymeric material they can be used together. Especially in the case where the same polymer is used to form both the slide rail and the rail support, the strength of the rail support may be enhanced by dispersing long fiber-shaped inorganic elements, or a powdered inorganic compound or the like, in the polymer.

According to the invention, a material whose principal component is a first polymeric material having wear resistance and heat resistance is used as the material of the slide rail, and a second material whose principal component is a polymeric material having higher strength is used as the material of the rail supporting member. Both materials are integrally attached to each other by a sandwich molding process, so that the wear resistance and the heat resistance of the slide rail material and the high strength properties of the rail support material, complement each other. Both materials are integrally joined with each other in a completely fused state, resulting in high strength properties that could not be attained by a conventional mechanical connection.

BRIEF DESCRIPTION OF THE DRAWINGS

Preferred embodiments of the invention will now be described in detail, by way of example only, with reference to the accompanying drawings, in which:

FIG. 3 is a cross-sectional view taken on surface III—III in FIG. 2(b);

DETAILED DESCRIPTION OF THE PREFERRED EMBODIMENT

Preferred embodiments of the invention will be described below with reference to the drawings.

FIGS. 1–5 relate to a sandwich-molded guide 10 for a transmission device in accordance with a first embodiment of the invention.

Figure 1:
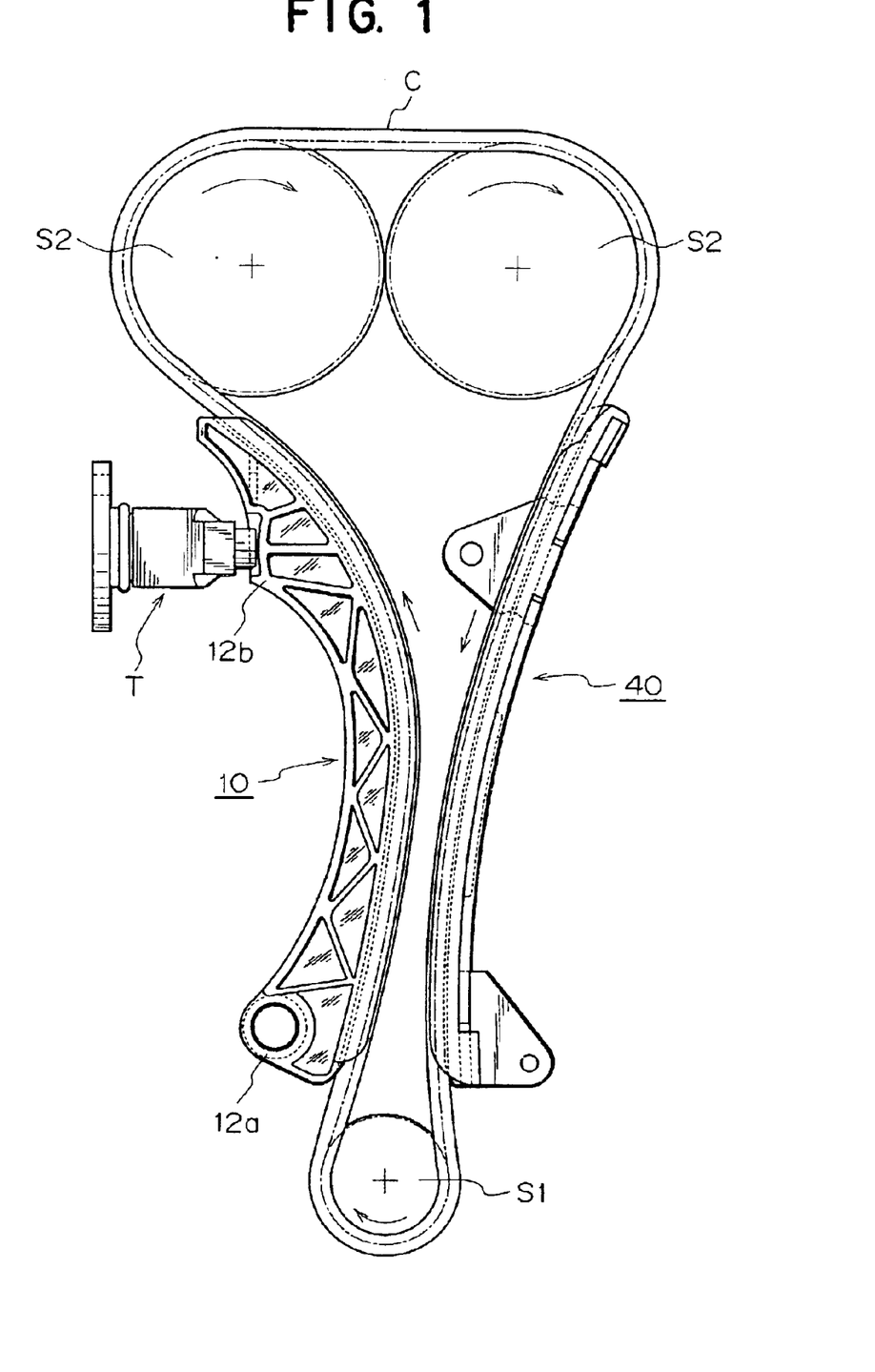
FIG. 1 is an elevational view of a power transmission incorporating a guide in accordance with the invention, for the purpose of explaining modes of use of the invention.

As shown in FIG. 1, a sandwich-molded guide 10 for a transmission device, in accordance with this embodiment, is used inside a motor vehicle engine in which power is transmitted by an endless chain C, which travels in a circulating path around a driving sprocket S1 and a driven sprocket S2. More specifically, the sandwich-molded guide 10 is used as a movable guide, over which the chain C slides, and which controls tension in the chain.

Figure 2A:
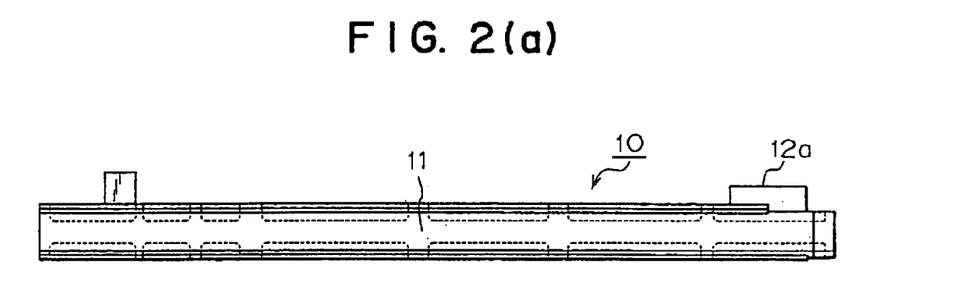
FIG. 2(a) is a top plan view of a sandwich-molded guide in accordance with a first embodiment of the invention.
Figure 2B:
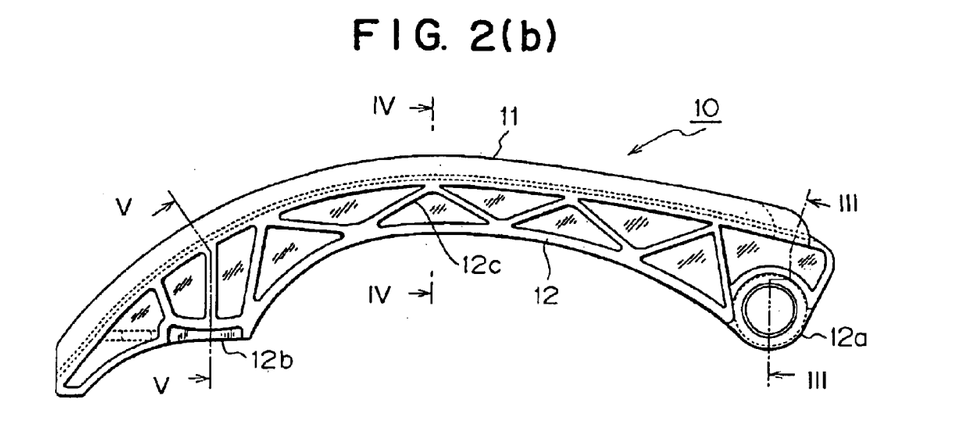
FIG. 2(b) is a front elevational view thereof.
Figure 2C:
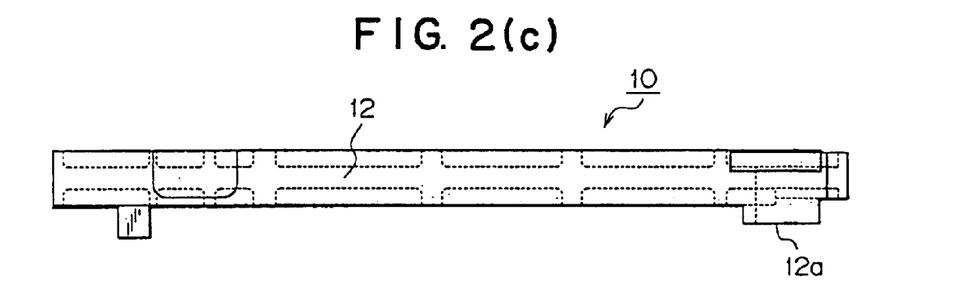
FIG. 2(c) is a bottom plan view thereof.

As shown in FIGS. 2(a) and 2(b), the sandwich-molded guide 10 comprises a slide rail 11 having a substantially arc-shaped contact surface on which the chain C (FIG. 1) slides. The guide comprises a rail supporting member 12, provided on and projecting vertically from the back of slide rail 11. The rail supporting member 12 extends longitudinally along the length of the slide rail 11, and projects from the rear of the slide rail in a direction perpendicular to the contact surface. The rail supporting member 12 includes a boss 12a having a mounting hole 13 for mounting the guide 10 on an engine block wall so that it can serve as a movable guide. The guide 10 also comprises a tensioner abutting portion 12b for engagement with a tensioner T (FIG.1). The tensioner functions to prevent transmission failure due to excess stretching or excess loosening of the chain C, by applying appropriate tension to the chain. The tensioner also includes reinforcing ribs 12c, which reinforce the tensioner while also reducing its weight.

Figure 3:
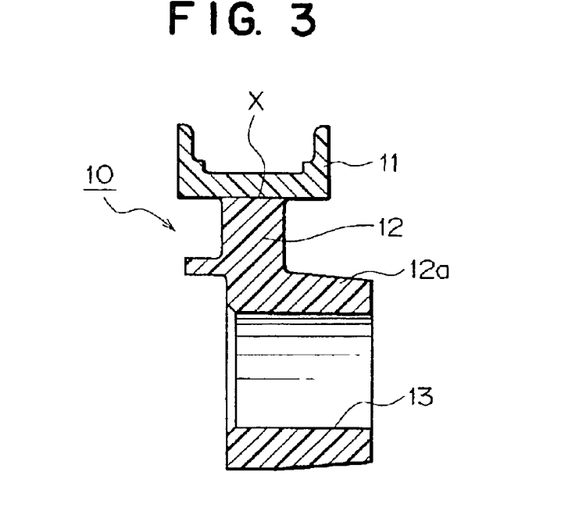
FIG. 3 is a cross-sectional view taken on surface A—A in FIG. 2(b)
Figure 4:
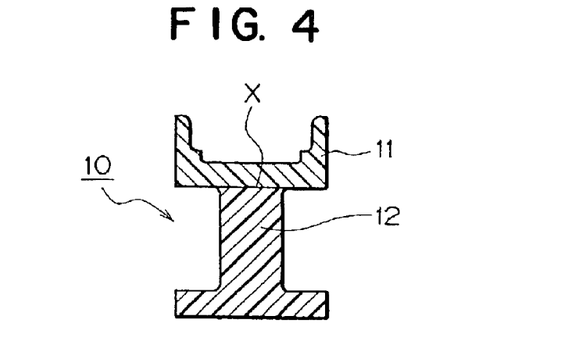
FIG. 4 is a cross-sectional view taken on plane IV—IV in FIG. 2(b)
Figure 5:
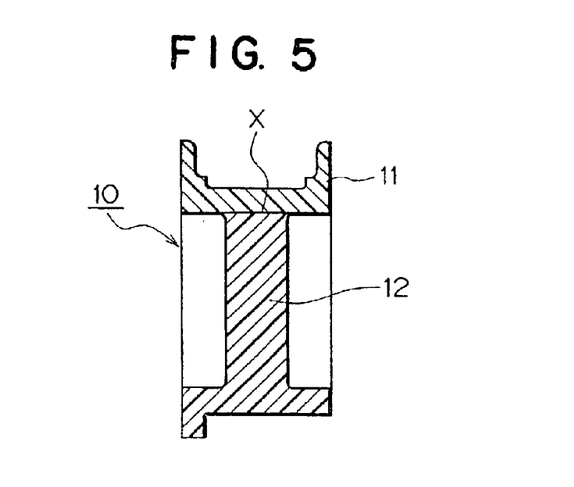
FIG. 5 is a cross-sectional view taken on surface V—V in FIG. 2(b)

As shown in FIGS. 3–5, the slide rail 11 is composed of a material the principal component of which is a first polymeric material having wear resistance and heat resistance. Any nylon from the group consisting of nylon 6, nylon 66, nylon 46, and all aromatic nylons, may be used as the first polymeric material, and the appropriate material may be selected depending on the environment in which it is to be used, especially the temperature to which the guide will be exposed within the engine in which the guide is to be installed.

On the other hand, the rail supporting member 12 is composed of a material the principal component of which is a second polymeric material. The second polymeric material comprises dispersed, long, fiber-shaped inorganic elements, or dispersed particulate inorganic material, in a polymer such as nylon 6, nylon 66 or the like. The mechanical strength of the rail supporting member 12 is enhanced compared with that of the slide rail body 11, by the inclusion of the dispersed inorganic fiber-shaped elements or particulate material.

The wear-resistant and heat-resistant material containing the first polymeric material, and the high-strength material containing the second polymeric material, are integrally joined with each other in a completely fused state by simultaneously injection-molding the slide rail 11 and the rail supporting member 12 by a sandwich molding process, using an injection-molding machine having parallel sandwich nozzles for sandwich molding. The slide rail 11 and the rail supporting member 12 are fused at the boundary region X (FIGS. 3–5) so that they are intimately joined to each other.

The sandwich-molded guide 10 thus obtained can be manufactured easily in a single mold, without using a conventional complex mold or a multi-step manufacturing process. Because the slide rail 11 and the rail supporting member 12 are integrally joined to each other in a complete fused state, the sandwich-molded guide 10 exhibits both higher mechanical strength and enhanced sliding contact properties and wear resistance, in a compatible manner. Moreover, because it is light in weight and has enhanced endurance, it is well adapted to serve as a movable guide. Accordingly, the sandwich-molded guide 10, when used with a tensioner inside a motor vehicle engine to control tension in a circulating chain, prevents power transmission failures resulting from excess stretching and excess loosening of the chain.

FIGS. 6–9 relate to a sandwich-molded guide 20 for a transmission device in accordance with a second embodiment of the invention.

Figure 6A:
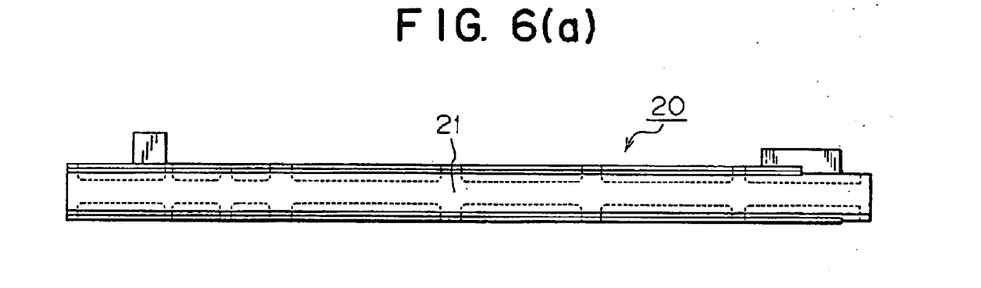
FIG. 6(a) is a top plan view of a sandwich-molded guide in accordance with a second embodiment of the invention.
Figure 6B:
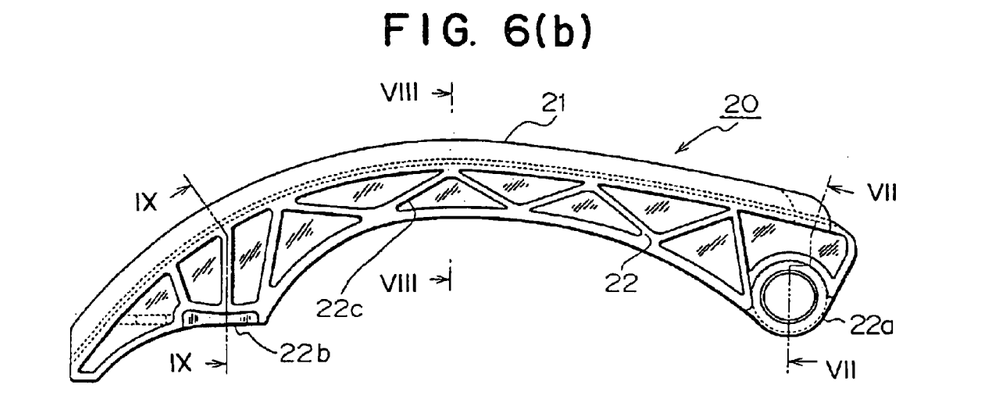
Figure 6C:
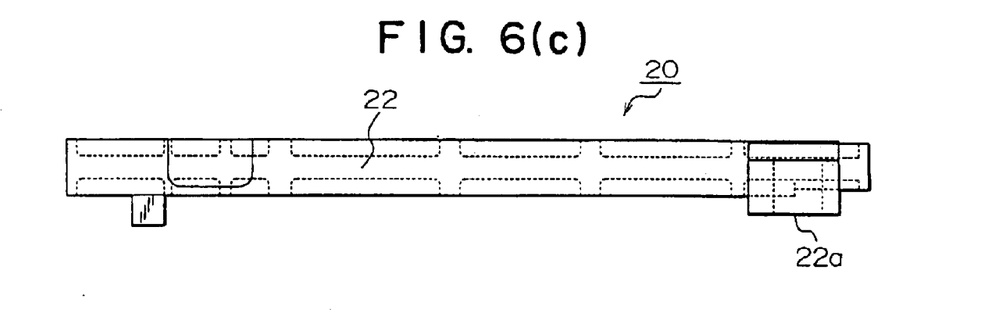
Figure 7:
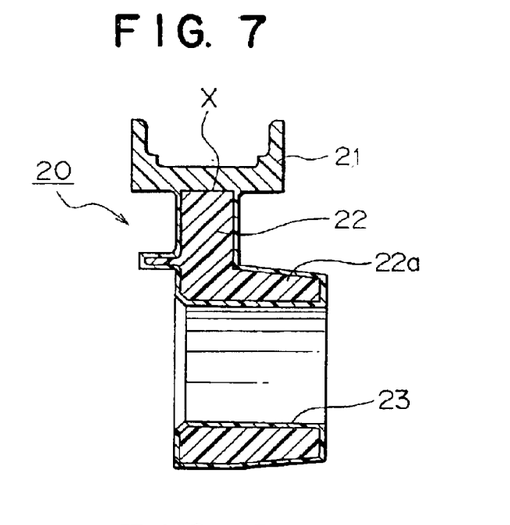
FIG. 7 is a cross-sectional view taken on surface VII—VII in FIG. 6(b)
Figure 8:
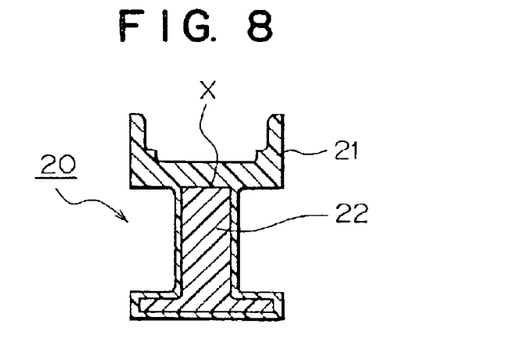
FIG. 8 is a cross-sectional view taken on plane VIII—VIII in FIG. 6.
Figure 9:
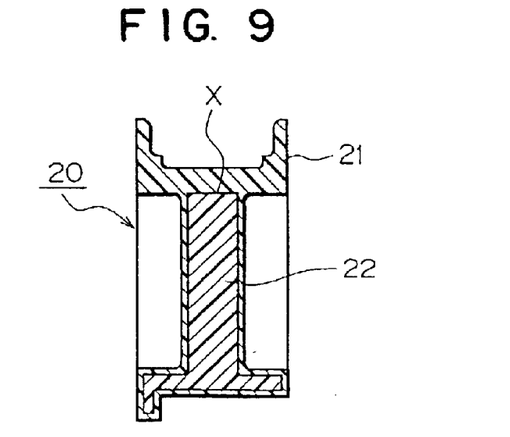
FIG. 9 is a cross-sectional view taken on surface IX—IX in FIG. 6.

As in the case of the sandwich-molded guide 10 of the first embodiment, the sandwich-molded guide 20 comprises a slide rail 21 having a substantially arc-shaped sliding contact surface on which a circulating chain C slides. The guide also comprises a rail supporting member 22, provided on and projecting vertically from the back of slide rail 21. The rail supporting member 22 extends longitudinally along the length of the slide rail 11, and projects from the rear of the slide rail in a direction perpendicular to the contact surface. The rail supporting member 22 includes a boss 22a having a mounting hole 23 for mounting the guide 20 on an engine block wall so that it can serve as a movable guide. The guide 20 also comprises a tensioner abutting portion 22b for engagement with a tensioner (not shown). The tensioner functions to prevent transmission failure due to excess stretching or excess loosening of the chain C, by applying appropriate tension to the chain. The tensioner also includes reinforcing ribs 22c, which reinforce the tensioner while also reducing its weight.

The slide rail 21 is composed of a material the principal component of which is a first polymeric material having wear resistance and heat resistance as in the first embodiment. Any one of materials of nylon 6, nylon 66, nylon 46, and all aromatic nylons, may be used as the first polymeric material. On the other hand, the rail supporting member 22 is composed of a material the principal component of which is a second polymeric material. The second polymeric material is an enhanced polymeric material comprising dispersed, long, fiber-shaped, elements of inorganic material, or dispersed, particulate inorganic material in a polymer such as nylon 6, nylon 66 or the like.

The slide rail 21 and the rail supporting member 22 are molded by a sandwich molding process, in which they are intimately joined to each other. At the same time, the surface layers of the slide rail 21 and rail supporting member 22 are integrally coating-molded by the same wear-resistant and heat-resistant material of which the slide rail 21 is composed.

To sandwich-mold such a structure in a sandwich-molding injection molding machine, a material having, as its principal component, the wear-resistant and heat-resistant first polymeric material is first injected from a sandwich nozzle into a single mold having a hollow shaped so that it corresponds to the outer shape of the molded guide. The injected polymeric material forms the surface layer portion of the entire guide.

Then, as soon as the surface layer portion is formed, two kinds of molten polymeric materials are simultaneously injected to form the slide rail 21 and the rail supporting member 22. These polymeric materials consist of a material the principal component of which is the first, wear-resistant and heat-resistant polymeric material, and second material the principal component of which is a second polymeric material containing as reinforcement, dispersed, long, fiber-shaped elements of inorganic material, or dispersed particulate inorganic material.

In the sandwich-molded guide 20 thus obtained, the slide rail 21 and the rail supporting member 22 are joined more strongly to each other than the corresponding elements of the first embodiment. The improved strength of the joint between the slide rail 21 and the rail supporting member 22 is achieved by coating-molding of their surface layers. Furthermore, since the surface layer portions of the boss 22a and mounting hole 23 on one end of the rail supporting member 22 are injection-molded by the material whose principal component is the wear-resistant and heat-resistant first polymeric material, the sandwich-molded guide 20 can function smoothly for a long period of time as a pivotally movable guide for applying appropriate tension in order to avoid excessive tension or loosening of a circulating chain.

As explained above, in the sandwich-molded guide for a transmission device according to the invention, the slide rail is composed of a material the principal component of which is a first polymeric material having good wear resistance and heat resistance, and the rail supporting member is composed of a material the principal component of which is a second polymeric material having enhanced strength. By integrally fusing the slide rail and the rail supporting member by a sandwich molding process, the sliding contact properties and wear resistance required for the slide rail on which the chain slides in a high temperature environment such as the inside of a motor vehicle engine are achieved. At the same time the high level of strength required for the rail supporting member is ensured over a long period of time. The sandwich molded construction enables these two objectives to be achieved in a compatible manner. The sandwich-molded guide for a transmission device according to the invention can be utilized as a movable guide, such as a tensioner lever, to apply appropriate tension to a belt, chain, or the like in a transmission device or similar mechanism. The sandwich molded guide can also be used as a fixed guide such as a guide rail, which guides and limits the traveling path of a belt, chain, or the like.

The sandwich-molded guide for a transmission device according to the invention is injection-molded in a single mold, using a sandwich-molding process. Thus, the molding of the slide rail, molding of the rail supporting member and joining of the slide rail to the rail supporting member can be carried out at the same time or substantially at the same time in a single step. Complex manufacturing steps and special molds are thus avoided, manufacture of the guide is simplified, and the manufacturing cost of the guide can be significantly reduced. Furthermore, since a core composed of a steel sheet or the like is not required, the weight of the guide can be reduced, and a reduction in the cost of fuel needed to operate an internal combustion engines can be achieved as a result.

By injection molding using a sandwich-molding process two kinds of polymeric materials can be injected simultaneously or substantially simultaneously, and the two kinds polymeric materials can be integrally joined to each other in a complete fused state. Accordingly, the wear resistance and heat resistance, of the first polymeric material and the high strength properties of the second polymeric material can be achieved compatibly, and can complement each other in the guide. Moreover, the material the principal component of which is the first polymeric material, and the material the principal component of which is the second polymeric material, can be selected freely taking into account the relationships between wear resistance heat resistance, and high strength properties, depending on the temperature of the environment in which the guide will be used.

Obviously, various minor changes and modifications of the invention are possible in the light of the above teaching. It is therefore to be understood that within the scope of the appended claims, the invention may be practiced otherwise than as specifically described.

What is claimed is:

1. A guide for guiding and maintaining tension in a power transmission medium in a transmission device, the guide comprising a slide rail on which a power transmission medium slides, and a rail supporting member integral with, and extending along, the slide rail, wherein the slide rail is a molded rail having a front surface adapted for sliding contact with a power transmission medium and a back surface, said rail being composed of a first material, the principal component of which is a first polymeric material having wear resistance and heat resistance, the rail supporting member extends along a portion of said back surface of the slide rail and comprises a second material, the principal component of which is a second polymeric material, said second material having higher strength than said first polymeric material, the slide rail and the rail supporting member are sandwich molded, and the rail supporting member has a sandwich molded coating layer composed of said first material, said coating layer covering said second material of the rail-supporting member, whereby the entire outer surface of the guide is composed of said first material.

2. The guide according to claim 1, wherein the material the principal component of which is said second polymeric material, is a composite material containing an inorganic material.

3. The guide according to claim 1, wherein the material the principal component of which is said second polymeric material, is a long fiber reinforced polymeric material.

4. The guide according to claim 1, wherein said first polymeric material and said second polymeric material are nylon 66.

5. The guide according to claim 1, wherein said first polymeric material and said second polymeric material are nylon 6.

6. The guide according to claim 1, wherein said first polymeric material is nylon 46 and said second polymeric material is nylon 66.

7. The guide according to claim 1, wherein said first polymeric material and said second polymeric material are both aromatic nylon.

8. The guide according to claim 1, wherein said second material, the principal component of which is said second polymeric material, is a composite material containing an inorganic material, and wherein said first polymeric material and said second polymeric material are nylon 66.

9. The guide according to claim 1, wherein said second material, the principal component of which is said second polymeric material, is a long fiber reinforced polymeric material, and wherein said first polymeric material and said second polymeric material are nylon 66.

10. The guide according to claim 1, wherein said second material, the principal component of which is said second polymeric material, is a composite material containing an inorganic material, and wherein said first polymeric material and said second polymeric material are nylon 6.

11. The guide according to claim 1, wherein said second materials, the principal component of which is said second polymeric material, is a long fiber reinforced polymeric material, and wherein said first polymeric material and said second polymeric material are nylon 6.

12. The guide according to claim 1, wherein said second material the principal component of which is said second polymeric material, is a composite material containing an inorganic material, and wherein said first polymeric material is nylon 46 and said second polymeric material is nylon 66.

13. The guide according to claim 1, wherein said second material, the principal component of which is said second polymeric material, is a long fiber reinforced polymeric material, and wherein said first polymeric material is nylon 46 and said second polymeric material is nylon 66.

14. The guide according to claim 1, wherein said second material the principal component of which is said second polymeric material, is a composite material containing an inorganic material, and wherein said first polymeric material and said second polymeric material are both aromatic nylon.

15. The guide according to claim 1, wherein said second material, the principal component of which is said second polymeric material, is a long fiber reinforced polymeric material, and wherein said first polymeric material and said second polymeric material are both aromatic nylon.

* * * * *